United States Patent
Cho et al.

(10) Patent No.: US 8,836,259 B2
(45) Date of Patent: Sep. 16, 2014

(54) SENSORLESS BLDC MOTOR SYSTEMS AND DRIVING METHODS OF SENSORLESS BLDC MOTOR

(75) Inventors: Young Kyun Cho, Daejeon (KR); Hui Dong Lee, Daejeon (KR); Jaewon Nam, Daejeon (KR); Jong-Kee Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 366 days.

(21) Appl. No.: 13/347,128

(22) Filed: Jan. 10, 2012

(65) Prior Publication Data

US 2012/0242266 A1    Sep. 27, 2012

(30) Foreign Application Priority Data

Mar. 24, 2011 (KR) .................. 10-2011-0026346

(51) Int. Cl.
*H02P 6/00* (2006.01)
*H02P 6/14* (2006.01)

(52) U.S. Cl.
CPC .................................. *H02P 6/142* (2013.01)
USPC ...................... 318/400.32; 318/727; 318/782

(58) Field of Classification Search
USPC ............ 318/400.32, 727, 782, 798, 802, 805, 318/812, 400.01, 811, 799, 400.11, 400.34, 318/400.06
See application file for complete search history.

(56) References Cited

U.S. PATENT DOCUMENTS

| | | | |
|---|---|---|---|
| 5,012,167 A | 4/1991 | Hendricks | |
| 6,570,353 B2 | 5/2003 | Krotsch et al. | |
| 7,098,624 B2 * | 8/2006 | Kusaka | 318/727 |
| 7,535,188 B2 * | 5/2009 | Fukamizu et al. | 318/254.1 |
| 7,778,529 B2 | 8/2010 | Wilharm | |

FOREIGN PATENT DOCUMENTS

| | | |
|---|---|---|
| KR | 1019970024420 A | 6/1997 |
| KR | 20-0141202 Y | 12/1998 |
| KR | 1020080090984 A | 9/2008 |
| KR | 10-0888944 B1 | 3/2009 |

* cited by examiner

Primary Examiner — Karen Masih
(74) Attorney, Agent, or Firm — Ladas & Parry LLP

(57) ABSTRACT

Provided is a sensorless BLDC motor system. The sensorless BLDC motor system includes a BLDC motor, a comparator, a motor controller, a three-phase inverter, and a mode selector. The BLDC motor includes first to third coils. The comparator compares a voltage of a specific coil of the first to third coils with a neutral-point voltage to output the compared result. The voltage of the specific coil becomes equal to the neutral-point voltage and a specific time elapses, and then the motor controller generates first and second coil control signals based on the compared result. The three-phase inverter supplies a source voltage or ground voltage to the specific coil, or floats the specific coil, in response to the first and second coil control signals. The mode selector selects a driving mode of the BLDC motor by adjusting the specific time.

14 Claims, 9 Drawing Sheets

Fig. 5

| Operation Stage | CU | CV | CW |
|---|---|---|---|
| 1 | H | L | H |
| 2 | H | L | F |
| 3 | H | L | L |
| 4 | H | F | L |
| 5 | H | H | L |
| 6 | F | H | L |
| 7 | L | H | L |
| 8 | L | H | F |
| 9 | L | H | H |
| 10 | L | F | H |
| 11 | L | L | H |
| 12 | F | L | H |

Fig. 8

| Operation Stage | CU | CV | CW |
|---|---|---|---|
| 1 | H | L | F |
| 2 | H | F | L |
| 3 | F | H | L |
| 4 | L | H | F |
| 5 | L | F | H |
| 6 | F | L | H |

SENSORLESS BLDC MOTOR SYSTEMS AND DRIVING METHODS OF SENSORLESS BLDC MOTOR

CROSS-REFERENCE TO RELATED APPLICATIONS

This U.S. non-provisional patent application claims priority under 35 U.S.C. §119 of Korean Patent Application No. 10-2011-0026346, filed on Mar. 24, 2011, the entire contents of which are hereby incorporated by reference.

BACKGROUND OF THE INVENTION

The present invention disclosed herein relates to an electric motor, and more particularly, to a Brushless Direct Current (BLDC) motor system and a driving method of a BLDC motor.

BLDC motors are configured with a stator using an armature, and a rotor using a permanent magnet. BLDC motors commutate a current that flows in coils of an armature, for forming a continuous rotating magnetic field that rotates a rotator. In BLDC motors, the continuous rotating magnetic field for rotating the rotator is formed when the position of the rotator is matched with a commutation time.

As a method of detecting the position of a rotator, a hall sensor is used. The hall sensor senses an electric field to detect the position of a permanent magnet in the rotator. However, the hall sensor is vulnerable to a high-temperature and high-pressure environment, and when the hall sensor is not inserted into an accurate position, the hall sensor outputs a wrong output value.

As another method of detecting the position of a rotator, a sensorless BLDC motor driving circuit is used. The sensorless BLDC motor driving circuit detects a counter electromotive force that is formed in coils of a BLDC motor, thereby detecting the position of a permanent magnet in the rotator.

SUMMARY OF THE INVENTION

The present invention provides a BLDC motor system and a driving method of a BLDC motor, which support a 120-degree driving mode and a 150-degree driving mode.

Embodiments of the present invention provide sensorless BLDC motor systems including: a BLDC motor including first to third coils; a comparator comparing a voltage of a specific coil of the first to third coils with a neutral-point voltage to output the compared result; a motor controller generating first and second coil control signals based on the compared result, wherein the voltage of the specific coil becomes equal to the neutral-point voltage and a specific time elapses, and then the motor controller generates the first and second coil control signals; a three-phase inverter supplying a source voltage or ground voltage to the specific coil, or floating the specific coil, in response to the first and second coil control signals; and a mode selector selecting a driving mode of the BLDC motor by adjusting the specific time.

In some embodiments, the mode selector may adjust the specific time for the BLDC motor to be driven in one of a 120-degree driving mode and 150-degree driving mode.

In other embodiments, the mode selector may adjust the specific time to a time corresponding to a 30-degree rotation duration of the BLDC motor.

In still other embodiments, the mode selector may adjust the specific time to a time corresponding to a 15-degree rotation duration of the BLDC motor.

In even other embodiments, the voltage of the specific coil may increase to become equal to the neutral-point voltage and the specific time may elapse, and then the motor controller may activate the first coil control signal, and the three-phase inverter may supply the source voltage to the specific coil in response to the activation of the first coil control signal.

In yet other embodiments, the motor controller may float the specific coil after a time corresponding to a 120-degree rotation duration of the BLDC motor elapses.

In further embodiments, the motor controller may float the specific coil after a time corresponding to a 150-degree rotation duration of the BLDC motor elapses.

In still further embodiments, the voltage of the specific coil may decrease to become equal to the neutral-point voltage and the specific time elapses, and then the motor controller may activate the second coil control signal, and the three-phase inverter may supply the ground voltage to the specific coil in response to the activation of the second coil control signal.

In even further embodiments, the neutral-point voltage may correspond to a voltage of a neutral point of the BLDC motor.

In other embodiments of the present invention, driving methods of a sensorless BLDC motor including first to third coils which include: determining a driving mode of the BLDC motor; determining a first time and a second time according to the determined driving mode; supplying a voltage to a specific coil of the first to third coils after a voltage of the specific coil becomes equal to a neutral-point voltage and the first time elapses; and floating the specific coil after the supplying of a voltage is performed and the second time elapses.

In some embodiments, the voltage of the specific coil may increase to become equal to the neutral-point voltage and the first time may elapse, and then a source voltage may be supplied to the specific coil.

In other embodiments, the voltage of the specific coil may decrease to become equal to the neutral-point voltage and the first time may elapse, and then a ground voltage may be supplied to the specific coil.

In still other embodiments, the determining of a driving mode may include determining a 120-degree driving mode, and the determining of a first time and a second time may include determining the first time as a time corresponding to a 30-degree rotation duration of the BLDC motor, and determining the second time as a time corresponding to a 120-degree rotation duration of the BLDC motor.

In even other embodiments, the determining of a driving mode may include determining a 150-degree driving mode, and the determining of a first time and a second time may include determining the first time as a time corresponding to a 15-degree rotation duration of the BLDC motor, and determining the second time as a time corresponding to a 150-degree rotation duration of the BLDC motor.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 5 is a table showing source voltages of first to third coils of a sensorless BLDC motor in a 150-degree driving mode;

FIG. 8 is a table showing source voltages of first to third coils of a sensorless BLDC motor in a 120-degree driving mode.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Figure 1:
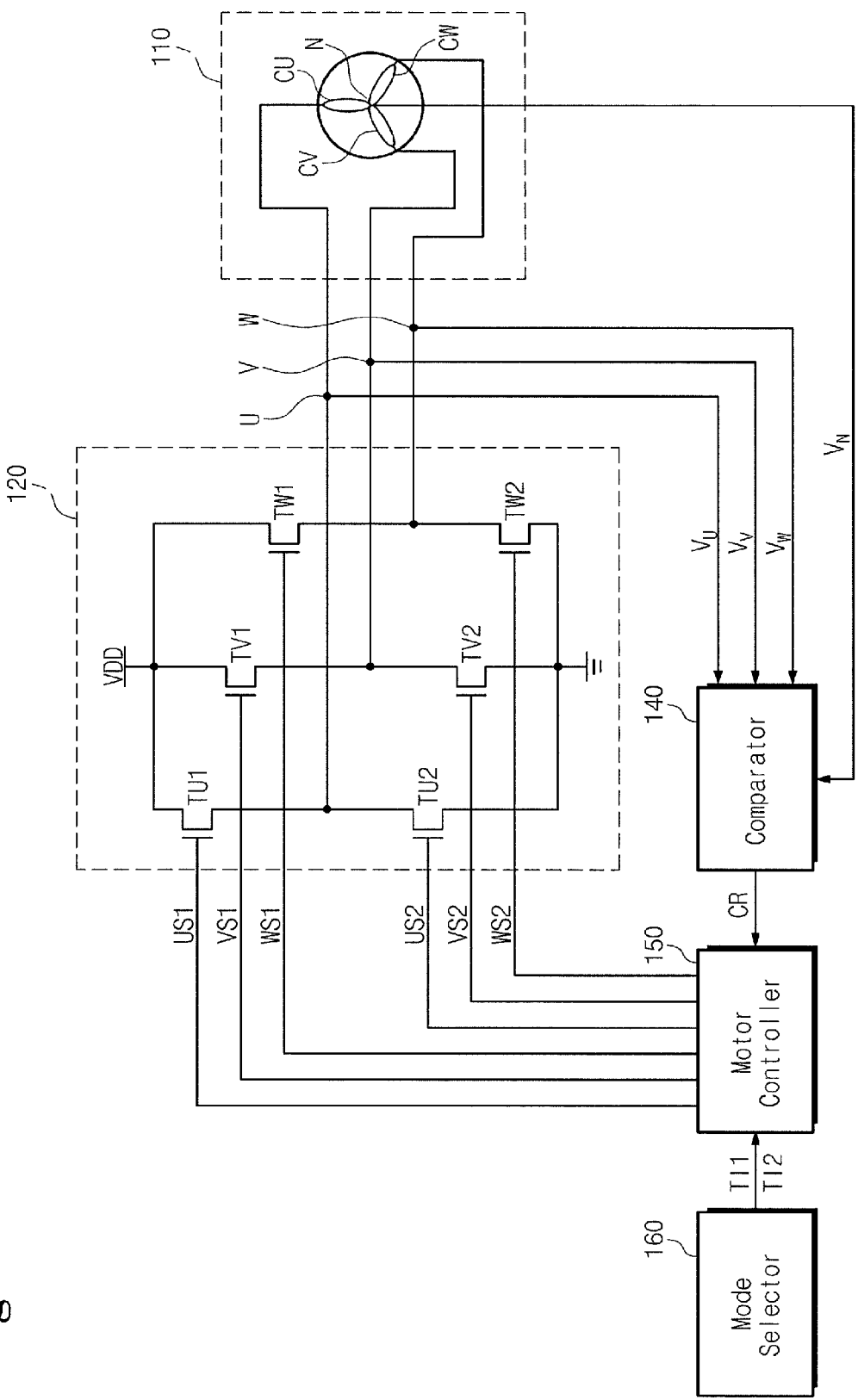
FIG. 1 is a block diagram illustrating a sensorless BLDC motor system according to a first embodiment of the present invention.

FIG. 1 is a block diagram illustrating a sensorless BLDC motor system 100 according to a first embodiment of the present invention.

Referring to FIG. 1, the sensorless BLDC motor system 100 includes a BLDC motor 110, a three-phase inverter 120, a comparator 140, a motor controller 150, and a mode selector 160.

The sensorless BLDC motor 110 includes a stator using an armature, and a rotor using a permanent magnet. For example, the stator of the senseless BLDC motor 110 is illustrated in FIG. 1, but the rotor of the stator of the sensorless BLDC motor 110 is not illustrated. The stator of the sensorless BLDC motor 110 includes a plurality of coils having different phases. As an example, the stator of the sensorless BLDC motor 110 may include a first coil CU having a U-phase, a second coil CV having a V-phase, and a third coil CW having a W-phase.

The three-phase inverter 120 supplies a power to the three coils CU, CV and CW of the stator of the sensorless BLDC motor 110. The three-phase inverter 120 may supply a power to the first coil CU through a first node U, supply a power to the second coil CV through a second node V, and supply a power to the third coil CW through a third node W.

The three-phase inverter 120 may operate according to the control of the motor controller 150. The three-phase inverter 120 may receive first and second U-signals US1 and US2, first and second V-signals VS1 and VS2, and first and second W-signals WS1 and WS2 from the motor controller 150. In response to the received signals US1, US2, VS1, VS2, WS1 and WS2, the three-phase inverter 120 may supply a source voltage VDD or a ground voltage VSS to the first to third coils CU, CV and CW through the respective first to third nodes C, V and W, or float the first to third coils CU, CV and CW.

The three-phase inverter 120 may include a plurality of transistors TU1, TU2, TV1, TV2, TW1 and TW2. The first and second U-transistors TU1 and TU2 are serially connected between a terminal receiving the source voltage VDD and another terminal receiving the ground voltage VSS. A node between the first and second U-transistors TU1 and TU2 is connected to the first coil CU through the first node U. When the first U-transistor TU1 is turned on, the source voltage VDD is supplied to the first coil CU. When the second U-transistor TU2 is turned on, the ground voltage VSS is supplied to the first coil CU. When the first and second U-transistors TU1 and TU2 are turned off, the first coil CU is floated.

The first and second V-transistors TV1 and TV2 are serially connected between a terminal receiving the source voltage VDD and another terminal receiving the ground voltage VSS. A node between the first and second V-transistors TV1 and TV2 is connected to the second coil CV through the second node V. The first and second V-transistors TV1 and TV2 may allow the source voltage VDD or ground voltage VSS to be the second coil CV, or allow the second coil CV to be floated.

The first and second W-transistors TW1 and TW2 are serially connected between a terminal receiving the source voltage VDD and another terminal receiving the ground voltage VSS. A node between the first and second W-transistors TW1 and TW2 is connected to the third coil CW through the second node W. The first and second W-transistors TW1 and TW2 may allow the source voltage VDD or ground voltage VSS to be the third coil CW, or allow the third coil CW to be floated.

The comparator 140 receives a voltage $V_U$ of the first coil CU, a voltage $V_V$ of the second coil CV, a voltage $V_W$ of the third coil CW, and a neutral-point voltage $V_N$. The comparator 140 compares the respective voltages $V_U$, $V_V$ and $V_W$ of the first to third coils CU, CV and CW with the neutral-point voltage $V_N$ to output a compared result CR.

The motor controller 150 receives the compared result CR from the comparator 140, and receives first and second time information TI1 and TI2 from the mode selector 160. The motor controller 150 may control the first and second U-signals US1 and US2, first and second V-signals VS1 and VS2, and first and second W-signals WS1 and WS2 on the basis of the first and second time information TI1 and T12 and compared result CR.

A specific voltage of the voltages $V_U$, $V_V$ and $V_W$ of the first to third coils CU, CV and CW increases to become equal to the neutral-point voltage $V_N$, and after a time (hereinafter referred to as a first time) corresponding to the first time information TI1 elapses, the motor controller 150 may activate a signal of the first U-signal US1, first V-signal VS1, and first W-signal WS1 corresponding to the specific voltage. The signal corresponding to the specific voltage is activated and a time (hereinafter referred to as a second time) corresponding to the second time information T12 elapses, and thereafter the motor controller 150 may float a coil corresponding to the specific voltage.

A specific voltage of the voltages $V_U$, $V_V$ and $V_W$ of the first to third coils CU, CV and CW decreases to become equal to the neutral-point voltage $V_N$, and after the first time elapses, the motor controller 150 may activate a signal of the second U-signal US2, second V-signal VS2, and second W-signal WS2 corresponding to the specific voltage. The signal corresponding to the specific voltage is activated and the second time elapses, and thereafter the motor controller 150 may float a coil corresponding to the specific voltage.

For example, the voltage $V_U$ of the first coil CU increases to become equal to the neutral-point voltage $V_N$, and after the first time elapses, the motor controller 150 may activate the first U-signal US1. The voltage $V_{UV}$ of the second coil CV increases to become equal to the neutral-point voltage $V_N$, and after the first time elapses, the motor controller 150 may activate the first V-signal VS1. The voltage $V_{UW}$ of the third coil CW increases to become equal to the neutral-point voltage $V_N$, and after the first time elapses, the motor controller 150 may activate the first W-signal WS1.

A specific voltage of the voltages $V_U$, $V_V$ and $V_W$ of the first to third coils CU, CV and CW decreases to become equal to the neutral-point voltage $V_N$, and after a time corresponding to the first time information TI1 elapses, the motor controller 150 may activate a signal of the second U-signal US2, second V-signal VS2, and second W-signal WS2 corresponding to the specific voltage.

For example, the voltage $V_U$ of the first coil CU decreases to become equal to the neutral-point voltage $V_N$, and after the first time elapses, the motor controller 150 may activate the second U-signal US2. The voltage $V_{UV}$ of the second coil CV increases to become equal to the neutral-point voltage $V_N$, and after the first time elapses, the motor controller 150 may activate the second V-signal VS2. The voltage $V_{UW}$ of the third coil CW increases to become equal to the neutral-point voltage $V_N$, and after the first time elapses, the motor controller 150 may activate the second W-signal WS2.

The signal corresponding to the specific voltage is activated and the second time elapses, and thereafter the motor controller 150 may float a coil corresponding to the specific voltage.

For example, the first U-signal US1 or second U-signal US2 are activated and the second time elapses, and thereafter the motor controller 150 may float the U-coil CU. The first V-signal VS1 or second V-signal VS2 are activated and the second time elapses, and thereafter the motor controller 150 may float the V-coil CV. The first W-signal WS1 or second W-signal WS2 are activated and the second time elapses, and thereafter the motor controller 150 may float the W-coil CW.

That is, based on the compared result CR and first and second time information TI1 and TI2, the motor controller 150 may supply the ground voltage VSS or source voltage VDD to the coils CU, CV and CW of the sensorless BLDC motor 110, or control the three-phase inverter 120 to be floated.

The mode selector 160 outputs the first and second time information TI1 and TI2. Exemplarily, when controlling the sensorless BLDC motor 110 in a 120-degree driving mode, the mode selector 160 may adjust the first time information TI1 to a time corresponding to a 30-degree rotation duration of the sensorless BLDC motor 110, and adjust the second time information TI2 to a time corresponding to a 120-degree rotation duration of the sensorless BLDC motor 110. In response to the adjusted first and second time information TI1 and TI2, the motor controller 150 may control the sensorless BLDC motor 120 in the 120-degree driving mode.

When controlling the sensorless BLDC motor 110 in a 150-degree driving mode, the mode selector 160 may adjust the first time information TI1 to a time corresponding to a 15-degree rotation duration of the sensorless BLDC motor 110, and adjust the second time information TI2 to a time corresponding to a 150-degree rotation duration of the sensorless BLDC motor 110. In response to the adjusted first and second time information TI1 and TI2, the motor controller 150 may control the sensorless BLDC motor 120 in the 150-degree driving mode.

The mode selector 160 may control the first and second time information TI1 and TI2 such that a duration exists in which a specific coil of the sensorless BLDC motor 110 is floated. In response to the adjusted first and second time information TI1 and TI2, the motor controller 150 may control the sensorless BLDC motor 120 in an arbitrary-degree driving mode.

Exemplarily, the comparator 140 is illustrated as receiving the neutral-point voltage $V_N$ from the sensorless BLDC motor 110, but is not limited thereto. As another example, the comparator 140 may receive the neutral-point voltage $V_N$ from an element other than the sensorless BLDC motor 110. For example, provided may be a voltage generator (not shown) that generates a voltage corresponding to the neutral-point voltage $V_N$ of the sensorless BLDC motor 110, and a voltage divider and filter 130 may receive the neutral-point voltage $V_N$ from the voltage generator.

Figure 2:
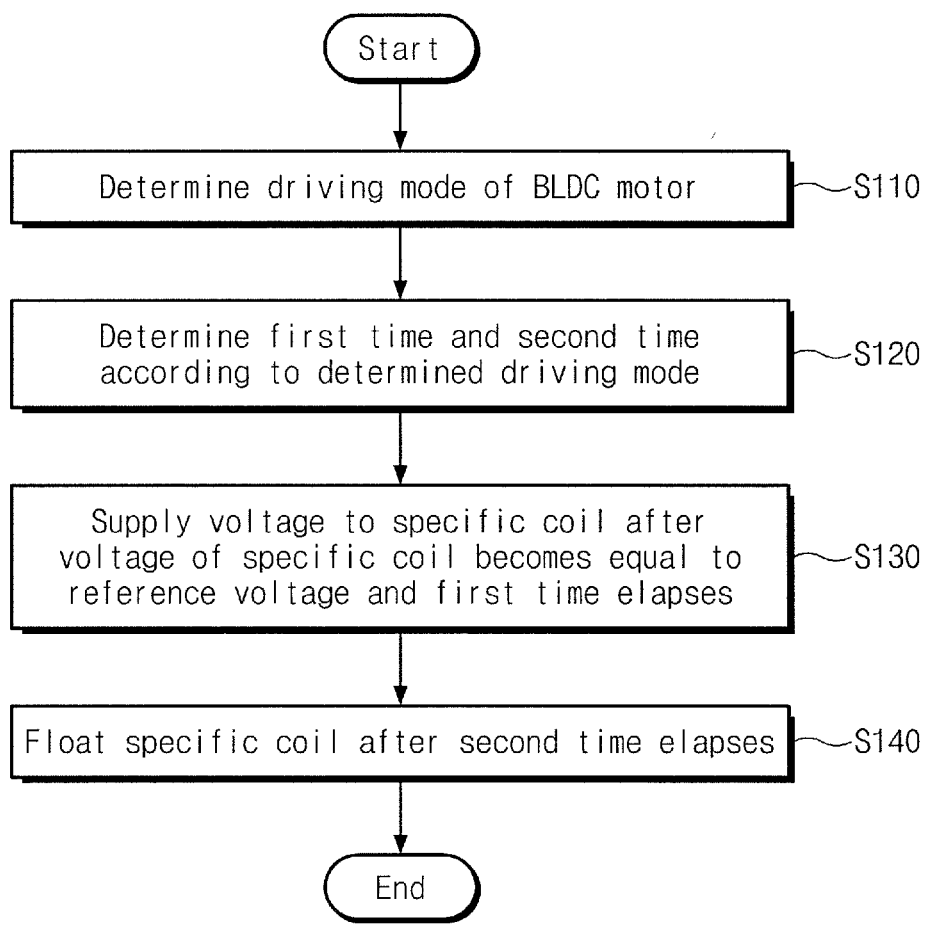
FIG. 2 is a flowchart illustrating a driving method of a sensorless BLDC motor, according to an embodiment of the present invention.

FIG. 2 is a flowchart illustrating a driving method of the sensorless BLDC motor 110, according to an embodiment of the present invention.

Referring to FIGS. 1 and 2, a driving mode of the BLDC motor 110 is determined in operation S110. For example, the mode selector 160 may select one from among the 120-degree driving mode and 150-degree driving mode. The mode selector 160 may select another driving mode different from the 120-degree driving mode and 150-degree driving mode.

In operation S120, the first time and second time are determined according to the determined driving mode. The first time indicates a time taken until a voltage $V_U$, $V_V$ or $V_W$ of a specific coil CU, CV or CW of the BLDC motor 110 becomes equal to the neutral-point voltage $V_N$ and then the voltage is supplied to the specific coil CU, CV or CW. The second time indicates a time taken until the specific coil CU, CV or CW receives a voltage and then is floated.

When the determined driving mode is the 120-degree driving mode, the first time may correspond to the 30-degree rotation duration of the sensorless BLDC motor 110, and the second time may correspond to the 120-degree rotation duration of the sensorless BLDC motor 110. When the determined driving mode is the 150-degree driving mode, the first time may correspond to the 15-degree rotation duration of the sensorless BLDC motor 110, and the second time may correspond to the 150-degree rotation duration of the sensorless BLDC motor 110.

The mode selector 160 may adjust the first and second time information TI1 and TI2 according to the determined driving mode, and transfer the adjusted first and second time information TI1 and TI2 to the motor controller 150.

In operation S130, a voltage $V_U$, $V_V$ or $V_W$ of a specific coil CU, CV or CW becomes equal to the neutral-point voltage $V_N$, and after the first time elapses, the voltage is supplied to the specific coil CU, CV or CW.

A voltage $V_U$, $V_V$ or $V_W$ of a specific coil CU, CV or CW becomes equal to the neutral-point voltage $V_N$, and after the first time elapses, the motor controller 150 may activate a first signal US1, VS1 or WS1 or second signal US2, VS2 or WS2 corresponding to the specific coil CU, CV or CW.

For example, a voltage $V_U$, $V_V$ or $V_W$ of a specific coil CU, CV or CW increases to become equal to the neutral-point voltage $V_N$, and after the first time elapses, the motor controller 150 may activate a first signal US1, VS1 or WS1 corresponding to the specific coil CU, CV or CW. When the first signal US1, VS1 or WS1 is activated, the source voltage VDD is supplied to the specific coil CU, CV or CW.

A voltage $V_U$, $V_V$ or $V_N$ of a specific coil CU, CV or CW decreases to become equal to the neutral-point voltage $V_N$, and after the first time elapses, the motor controller 150 may activate a second signal US2, VS2 or WS2 corresponding to the specific coil CU, CV or CW. When the second signal US2, VS2 or WS2 is activated, the ground voltage VDD is supplied to the specific coil CU, CV or CW.

In operation S140, a specific coil is floated after the second time elapses. A voltage is supplied to a specific coil CU, CV or CW, and after the second time elapses, the motor controller 150 may deactivate the signal that has been activated in operation S130. At this point, the specific coil CU, CV or CW may be floated.

Figure 3:
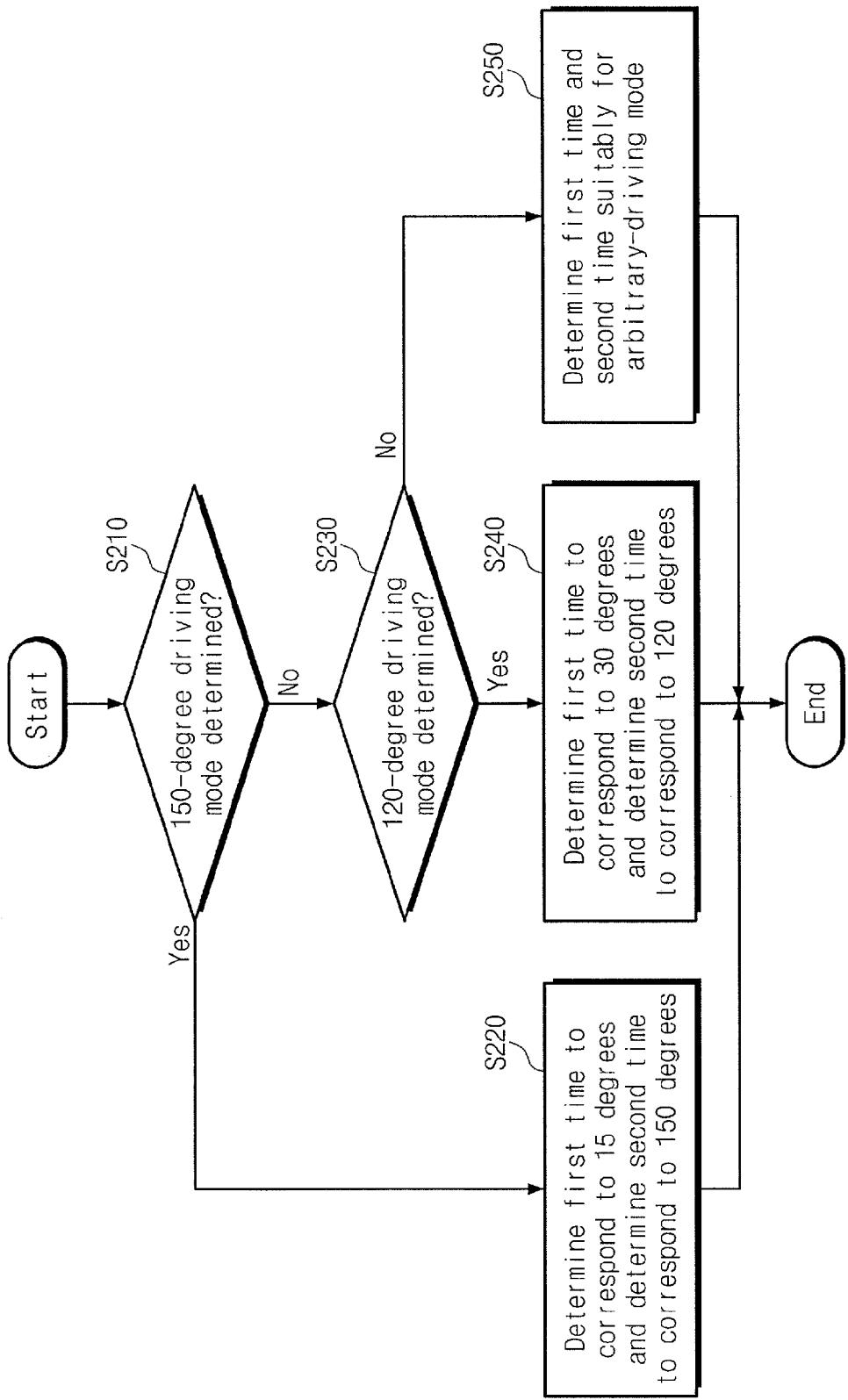
FIG. 3 is a flowchart illustrating a method of determining a first time and second time.

FIG. 3 is a flowchart illustrating a method of determining the first time and second time.

Referring to FIG. 3, whether the 150-degree driving mode has been determined is determined in operation 5210. When the 150-degree driving mode has been determined, the first time is determined as a time corresponding to the 15-degree rotation duration of the sensorless BLDC motor 110, and the second time is determined as a time corresponding to the 150-degree rotation duration of the sensorless BLDC motor 110 in operation 5220.

When the 150-degree driving mode has not been determined, whether the 120-degree driving mode has been determined is determined in operation 5230. When the 120-degree driving mode has been determined, the first time is determined as a time corresponding to the 30-degree rotation duration of the sensorless BLDC motor 110, and the second time is determined as a time corresponding to the 120-degree rotation duration of the sensorless BLDC motor 110 in operation S240.

When the 120-degree driving mode has not been determined, the arbitrary-degree driving mode is determined, and the first time and second time may be determined suitably for the arbitrary-driving mode in operation 5250.

A counter electro-motive force ($E_U$) of the first coil CU of the sensorless BLDC motor 110 may be defined as Equation (1) below.

$$E_U = (V_U - V_N) - L_U \frac{dI_U}{dt} - R_U I_U \quad (1)$$

where $L_U$ indicates an inductance of the first coil CU, $R_U$ indicates a resistance of the first coil CU, and $I_U$ indicates a current that flows in the first coil CU.

A counter electro-motive force ($E_V$) of the second coil CV of the sensorless BLDC motor 110 may be defined as Equation (2) below.

$$E_V = (V_V - V_N) - L_V \frac{dI_V}{dt} - R_V I_V \quad (2)$$

where $L_V$ indicates an inductance of the second coil CV, $R_V$ indicates a resistance of the second coil CV, and $I_V$ indicates a current that flows in the second coil CV.

A counter electro-motive force ($E_W$) of the third coil CW of the sensorless BLDC motor 110 may be defined as Equation (3) below.

$$E_W = (V_W - V_N) - L_W \frac{dI_W}{dt} - R_W I_W \quad (3)$$

where $L_W$ indicates an inductance of the third coil CW, $R_W$ indicates a resistance of the third coil CW, and $I_W$ indicates a current that flows in the third coil CW.

When a specific coil CU, CV or CW of the sensorless BLDC motor 110 is in a floated state, there is no current that flows through the specific coil CU, CV or CW. Accordingly, a counter electro-motive force ($E_U$, $E_V$ or $E_W$) of the specific coil CU, CV or CW may be calculated from a difference between the voltage $V_U$, $V_V$ or $V_W$ of the specific coil CU, CV or CW and the neutral-point voltage $V_N$. For example, when the voltage $V_U$, $V_V$ or $V_W$ of the specific coil CU, CV or CW is equal to the neutral-point voltage $V_N$, the counter electro-motive force ($E_U$, $E_V$ or $E_W$) of the specific coil CU, CV or CW may be zero.

The sensorless BLDC motor system 100 and the driving method of the sensorless BLDC motor 110 controls a specific coil CU, CV or CW to be floated at a time when a counter electro-motive force of the specific coil CU, CV or CW is zero. Therefore, the driving method can simply determine a time when the counter electro-motive force ($E_U$, $E_V$ or $E_W$) of the specific coil CU, CV or CW is zero, and simply determine a time when a source voltage is supplied to the specific coil CU, CV or CW.

Figure 4:
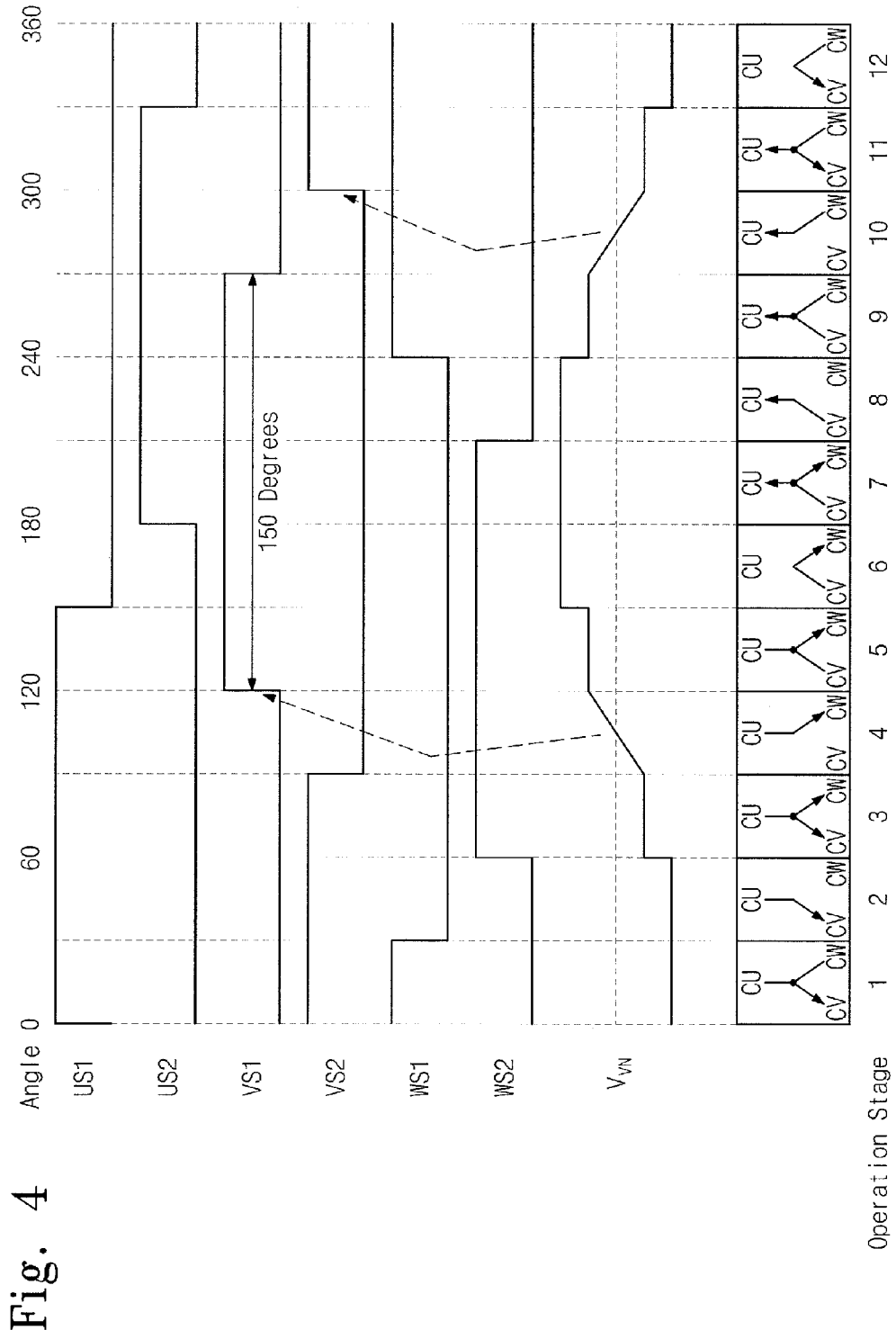
FIG. 4 is a timing diagram showing a method of operating a sensorless BLDC motor system in a 150-degree driving mode.

FIG. 4 is a timing diagram showing a method of operating the sensorless BLDC motor system 100 in the 150-degree driving mode. FIG. 5 is a table showing source voltages of the first to third coils CU, CV and CW of the sensorless BLDC motor 110 in the 150-degree driving mode. In the 150-degree driving mode, the first time may be set as a time corresponding to the 15-degree rotation duration of the sensorless BLDC motor 110, and the second time may be set as a time corresponding to the 150-degree rotation duration of the sensorless BLDC motor 110.

Exemplarily, an operation of the second coil CV will be described below with reference to FIGS. 1, 4 and 5. An operation of the first coil CU and an operation of the third coil CW may be performed identically to that of the second coil CV.

A 0-degree to 30-degree rotation duration of the sensorless BLDC motor 110 may configure a first operation stage. In the first operation stage, the first U-signal US1 is logic high, and the second U-signal US2 is logic low. Therefore, the source voltage VDD is supplied to the first coil CU. The first V-signal VS1 is logic low, and the second V-signal VS2 is logic high. Therefore, the ground voltage VSS is supplied to the second coil CV. The first W-signal WS1 is logic high, and the second W-signal WS2 is logic low. Therefore, the source voltage VDD is supplied to the third coil CW. A current flows from the first and third coils CU and CW to the second coil CV.

A 30-degree to 60-degree rotation duration of the sensorless BLDC motor 110 may configure a second operation stage. In the second operation stage, the first W-signal WS1 is shifted to a low level. Therefore, the third coil CW is floated. A current flows from the first coil CU to the second coil CV.

A 60-degree to 90-degree rotation duration of the sensorless BLDC motor 110 may configure a third operation stage. In the third operation stage, the second W-signal WS2 is shifted to a high level. Therefore, the ground voltage VSS is supplied to the third coil CW. A current flows from the first coil CU to the second and third coils CV and CW.

A 90-degree to 120-degree rotation duration of the sensorless BLDC motor 110 may configure a fourth operation stage. In the fourth operation stage, the second V-signal VS2 is shifted to a low level. Therefore, the second coil CV is floated. A current flows from the first coil CU to the third coil CW.

Since the second coil CV is in a floated state, a counter electro-motive force of the second coil CV may be a difference $V_{VN}$ between the voltage $V_V$ of the second coil CV and the neutral-point voltage $V_N$. When the second coil CV is in the floated state, the counter electro-motive force ($E_V$) of the second coil CV is changed from a negative value to a positive value through zero.

The counter electro-motive force ($E_V$) of the second coil CV reaches zero, and then when the first time (i.e., a time corresponding to 15 degrees) elapses, the first V-signal VS1 is activated. Since the fourth operation stage has 90 to 120 degrees and a time when the counter electro-motive force ($E_V$) of the second coil CV reaches zero is a time corresponding to 105 degrees, the first V-signal VS1 is activated at 120 degrees.

A 120-degree to 150-degree rotation duration of the sensorless BLDC motor 110 may configure a fifth operation stage. In the fifth operation stage, the first V-signal VS1 is shifted to a high level. Therefore, the source voltage VDD is supplied to the second coil CV. A current flows from the first and second coils CU and CV to the third coil CW.

A 150-degree to 180-degree rotation duration of the sensorless BLDC motor 110 may configure a sixth operation stage. In the sixth operation stage, the first U-signal US1 is shifted to a low level. Therefore, the first coil CU is floated. A current flows from the second coil CV to the third coil CW.

A 180-degree to 210-degree rotation duration of the sensorless BLDC motor 110 may configure a seventh operation stage. In the seventh operation stage, the second U-signal US2 is shifted to a high level. Therefore, the ground voltage VSS is supplied to the first coil CU. A current flows from the second coil CV to the first and third coils CU and CW.

A 210-degree to 240-degree rotation duration of the sensorless BLDC motor 110 may configure an eighth operation stage. In the eighth operation stage, the second W-signal WS2 is shifted to a low level. Therefore, the third coil CW is floated. A current flows from the second coil CV to the first coil CU.

A 240-degree to 270-degree rotation duration of the sensorless BLDC motor 110 may configure a ninth operation stage. In the ninth operation stage, the first W-signal WS1 is shifted to a high level. Therefore, the source voltage VDD is supplied to the third coil CW. A current flows from the second and third coils CV and CW to the first coil CU.

A 270-degree to 300-degree rotation duration of the sensorless BLDC motor 110 may configure a tenth operation stage. The first V-signal VS1 is activated at a 120-degree time. A 150-degree time corresponding to the second time elapses from the 120-degree time, and thereafter the first V-signal VS1 may be deactivated. That is, in the tenth operation stage, the first V-signal VS1 is shifted to a low level. Therefore, the second third coil CW is floated. A current flows from the third coil CW to the first coil CU.

Since the second coil CV is in a floated state, the counter electro-motive force ($E_V$) of the second coil CV may be the difference $V_{VN}$ between the voltage $V_V$ of the second coil CV and the neutral-point voltage $V_N$. When the second coil CV is in the floated state, the counter electro-motive force ($E_V$) of the second coil CV is changed from a positive value to a negative value through zero.

The counter electro-motive force ($E_V$) of the second coil CV reaches zero, and then when the first time (i.e., a time corresponding to 15 degrees) elapses, the second V-signal VS2 is activated. Since a time when the counter electro-motive force ($E_V$) of the second coil CV reaches zero is a time corresponding to 285 degrees, the second V-signal VS2 is activated at 300 degrees.

A 300-degree to 330-degree rotation duration of the sensorless BLDC motor 110 may configure an eleventh operation stage. In the eleventh operation stage, the second V-signal VS2 is shifted to a high level. Therefore, the ground voltage VSS is supplied to the second coil CV. A current flows from the third coil CW to the first and second coils CU and CV.

A 330-degree to 360-degree rotation duration of the sensorless BLDC motor 110 may configure a twelfth operation stage. In the twelfth operation stage, the second U-signal US2 is shifted to a high level. Therefore, the first coil CU is floated. A current flows from the third coil CW to the second coil CV.

As described above, the second coil CV is maintained in a floated state at a time when the counter electro-motive force ($E_V$) of the second coil CV passes through zero. Accordingly, a time when the counter electro-motive force ($E_V$) of the second coil CV reaches zero can be simply detected. When the counter electro-motive force ($E_V$) of the second coil CV increases to become zero, a pulse of the source voltage VDD having a 150-degree valid duration is supplied to the second coil CV after a time corresponding to 15 degrees elapses. When the counter electro-motive force ($E_V$) of the second coil CV decreases to become zero, a pulse of the ground voltage VSS having the 150-degree valid duration is supplied to the second coil CV after the time corresponding to 15 degrees elapses.

Likewise, the first coil CU and third coil CW may be controlled. In the sixth and twelfth operation stages where the first coil CU is floated, the counter electro-motive force ($E_U$) of the first coil CU may be a difference $V_{UN}$ between the voltage $V_U$ of the first coil CU and the neutral-point voltage $V_N$. Accordingly, a time when the counter electro-motive force ($E_U$) of the first coil CU reaches zero can be simply detected. When the counter electro-motive force ($E_U$) of the first coil CU becomes zero and then the time corresponding to 15 degrees elapses, a pulse of the source voltage VDD or ground voltage VSS having the 150-degree valid duration may be supplied to the first coil CU.

In the second and eighth operation stages where the third coil CW is floated, the counter electro-motive force ($E_W$) of the third coil CW may be the difference $V_{WN}$ between the voltage $V_W$ of the third coil CW and the neutral-point voltage $V_N$. Accordingly, a time when the counter electro-motive force ($E_W$) of the third coil CW reaches zero can be simply detected. When the counter electro-motive force ($E_W$) of the third coil CW becomes zero and then the time corresponding to 15 degrees elapses, a pulse of the source voltage VDD or ground voltage VSS having the 150-degree valid duration may be supplied to the third coil CW.

A time when each of the counter electro-motive forces ($E_U$, $E_V$ and $E_W$) of the respective first to third coils CU, CV and CW in the sensorless BLDC motor 110 reaches zero can be simply determined according to differences between the respective voltages $V_U$, $V_V$ and $V_W$ of the first to third coils CU, CV and CW and the neutral-point voltage $V_N$. After the time corresponding to 15 degrees elapses, a pulse of the source voltage VDD or ground voltage VSS having the 150-degree valid duration may be supplied to the first to third coils CU, CV and CW. Accordingly, a rotating magnetic field for continuously rotating the rotor of the sensorless BLDC motor 110 may be formed.

Figure 6:
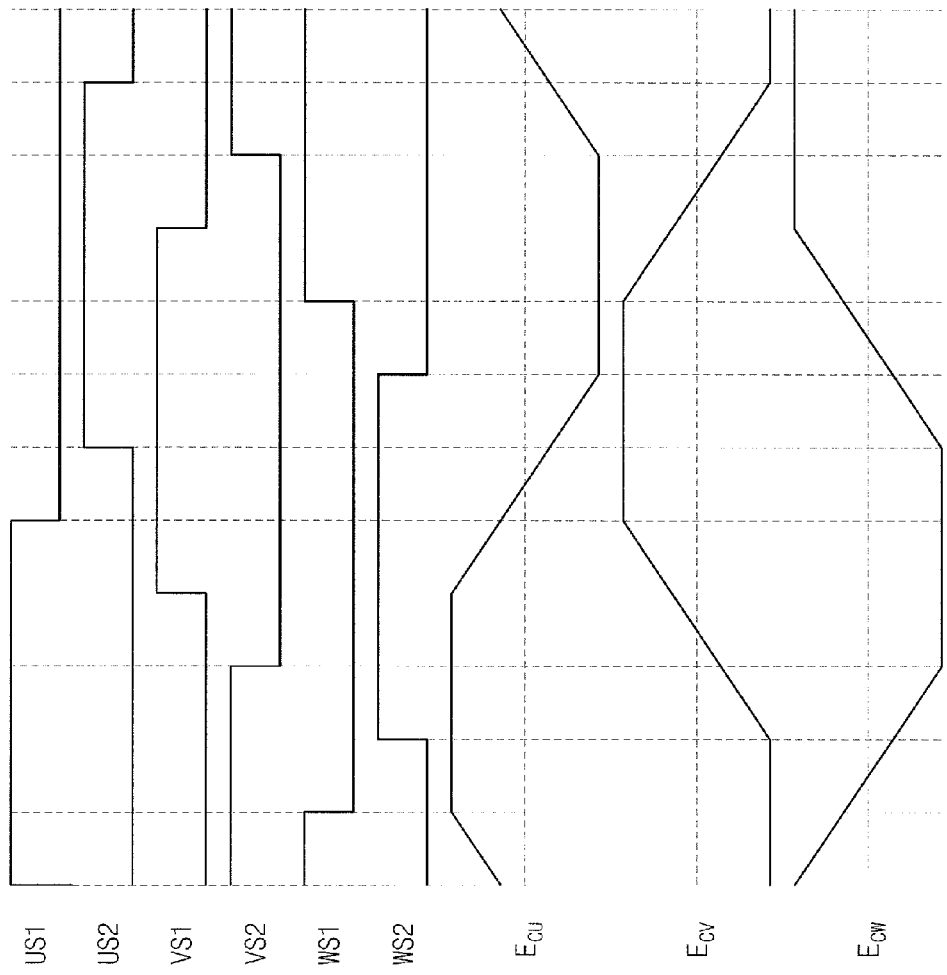
FIG. 6 is a timing diagram showing counter electro-motive forces of first to third coils and output signals of a motor controller based on the counter electro-motive forces.

FIG. 6 is a timing diagram showing the counter electro-motive forces ($E_U$, $E_V$ and $E_W$) of the respective first to third coils CU, CV and CW and the output signals of the motor controller 150 based on the counter electro-motive forces ($E_U$, $E_V$ and $E_W$). The waveforms, operation stages, and angles of the respective output signals of the motor controller 150 are the same as those of FIG. 4.

Referring to FIG. 6, the counter electro-motive force ($E_U$) of the first coil CU decreases to reach zero at a 165-degree time of the sixth operation stage. Subsequently, the second U-signal US2 is activated at a 180-degree time when a time corresponding to 15 degrees elapses. The counter electro-motive force ($E_U$) of the first coil CU increases to reach zero at a 345-degree time of the twelfth operation stage. Subsequently, the first U-signal US1 is activated at a 360-degree time when the time corresponding to 15 degrees elapses.

At a 105-degree time of the fourth operation stage, the counter electro-motive force ($E_V$) of the second coil CV increases to reach zero. Subsequently, the first V-signal VS1 is activated at a 120-degree time when the time corresponding to 15 degrees elapses. At a 285-degree time of the tenth operation stage, the counter electro-motive force ($E_V$) of the second coil CV decreases to reach zero. Subsequently, the second V-signal VS2 is activated at a 300-degree time when the time corresponding to 15 degrees elapses.

At a 45-degree time of the second operation stage, the counter electro-motive force ($E_W$) of the third coil CW decreases to reach zero. Subsequently, the second W-signal WS2 is activated at a 60-degree time when the time corresponding to 15 degrees elapses. At a 225-degree time of the eighth operation stage, the counter electro-motive force ($E_W$) of the third coil CW increases to reach zero. Subsequently, the first W-signal WS1 is activated at a 240-degree time when the time corresponding to 15 degrees elapses.

The activated signal is deactivated after the time corresponding to 15 degrees elapses.

Figure 7:
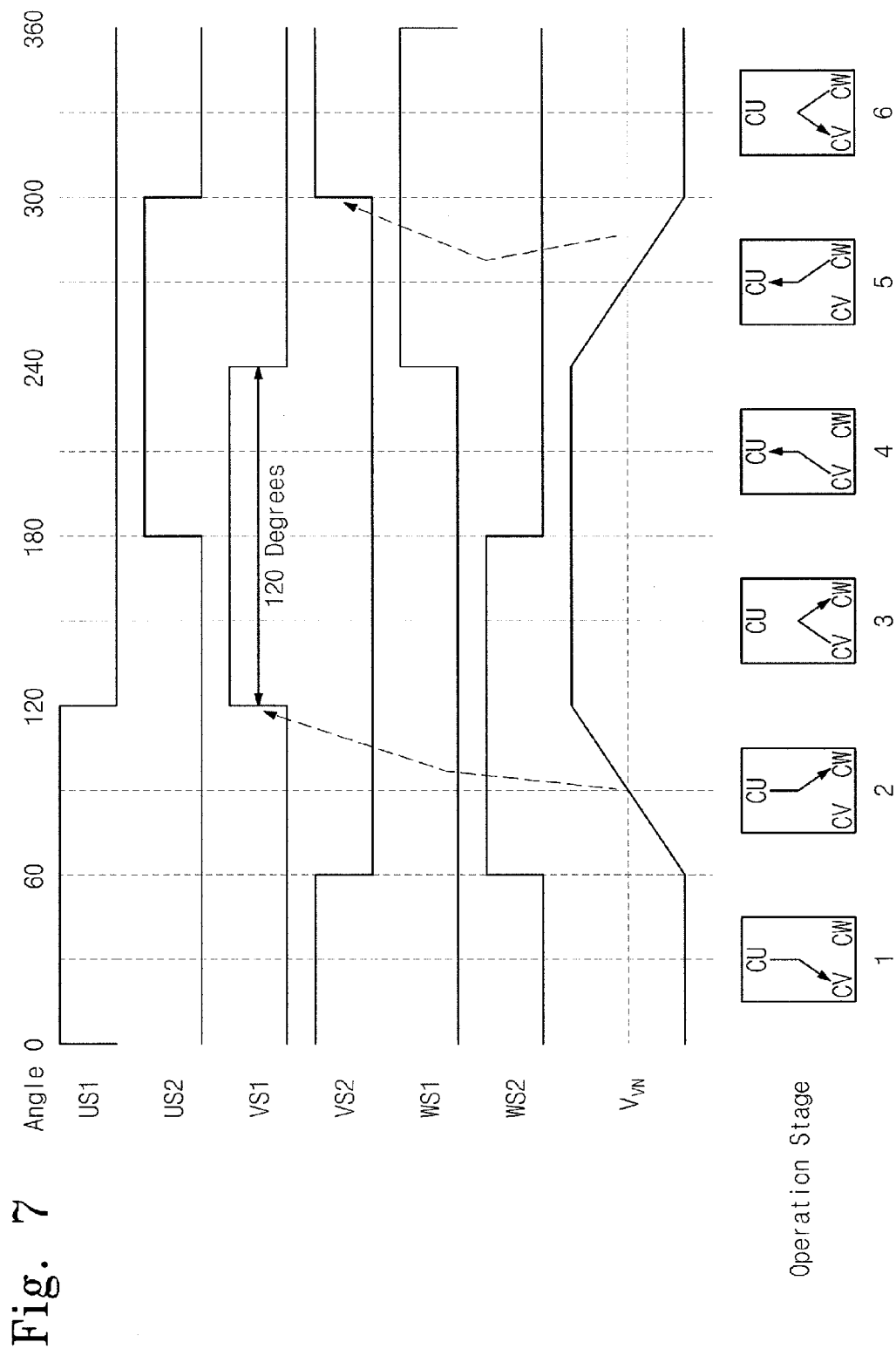
FIG. 7 is a timing diagram showing a method of operating a sensorless BLDC motor system in a 120-degree driving mode.

FIG. 7 is a timing diagram showing a method of operating a sensorless BLDC motor system 100 in the 120-degree driving mode. FIG. 8 is a table showing source voltages of first to third coils CU, CV and CW of the sensorless BLDC motor 110 in the 120-degree driving mode. In the 120-degree driving mode, the first time may be set as a time corresponding to the 30-degree rotation duration of the sensorless BLDC motor 110, and the second time may be set as a time corresponding to the 120-degree rotation duration of the sensorless BLDC motor 110.

Exemplarily, an operation of the second coil CV will be described below with reference to FIGS. 1, 7 and 8. An operation of the first coil CU and an operation of the third coil CW may be performed identically to that of the second coil CV.

A 0-degree to 60-degree rotation duration of the sensorless BLDC motor 110 may configure a first operation stage. In the first operation stage, the first U-signal US1 is logic high, and the second U-signal US2 is logic low. Therefore, the source voltage VDD is supplied to the first coil CU. The first V-signal VS1 is logic low, and the second V-signal VS2 is logic high. Therefore, the ground voltage VSS is supplied to the second coil CV. The first W-signal WS1 is logic low, and the second W-signal WS2 is logic low. Therefore, the third coil CW is floated. A current flows from the first coil CU to the second coil CV.

A 60-degree to 120-degree rotation duration of the sensorless BLDC motor 110 may configure a second operation stage. In the second operation stage, the second V-signal VS2 is shifted to a low level, and the second W-signal WS2 is shifted to a high level. Therefore, the second coil CV is floated, and the ground voltage VSS is supplied to the third coil CW. A current flows from the first coil CU to the third coil CW.

Since the second coil CV is in a floated state, the counter electro-motive force ($E_V$) of the second coil CV may be the difference $V_{VN}$ between the voltage $V_V$ of the second coil CV and the neutral-point voltage $V_N$. The counter electro-motive force ($E_V$) of the second coil CV is changed from a negative value to a positive value through zero. The counter electro-motive force ($E_V$) of the second coil CV reaches zero at a 90-degree time. Therefore, the first V-signal VS1 that supplies the source voltage VDD to the second coil CV is activated at a time when the first time (i.e., a time corresponding to 30 degrees) elapses from the 90-degree time.

A 120-degree to 180-degree rotation duration of the sensorless BLDC motor 110 may configure a third operation stage. In the third operation stage, the first U-signal US1 is shifted to a low level, and the first V-signal VS1 is shifted to a high level. Therefore, the first coil CU is floated, and the source voltage VDD is supplied to the second coil CV. A current flows from the second coil CV to the third coil CW.

A 180-degree to 240-degree rotation duration of the sensorless BLDC motor 110 may configure a fourth operation stage. In the fourth operation stage, the second U-signal US2 is shifted to a high level, and the second W-signal WS2 is shifted to a low level. Therefore, the ground voltage VSS is supplied to the first coil CU, and the third coil CW is floated. A current flows from the second coil CV to the first coil CU.

A 240-degree to 300-degree rotation duration of the sensorless BLDC motor 110 may configure a fifth operation stage. In the fifth operation stage, the first V-signal VS1 is shifted to a low level, and the first W-signal WS1 is shifted to a high level. Therefore, the second coil CV is floated, and the source voltage VDD is supplied to the third coil CW. A current flows from the third coil CW to the first coil CU.

Since the second coil CV is in a floated state, the counter electro-motive force ($E_V$) of the second coil CV may be the difference $V_{VN}$ between the voltage $V_V$ of the second coil CV and the neutral-point voltage $V_N$. The counter electro-motive force ($E_V$) of the second coil CV is changed from a positive value to a negative value through zero. The counter electro-motive force ($E_V$) of the second coil CV reaches zero at a 270-degree time. Therefore, the second V-signal VS2 that supplies the ground voltage VSS to the second coil CV is activated at a time when the first time (i.e., the time corresponding to 30 degrees) elapses from the 270-degree time.

A 300-degree to 360-degree rotation duration of the sensorless BLDC motor 110 may configure a sixth operation stage. In the sixth operation stage, the second U-signal US2 is shifted to a level corresponding to the ground voltage VSS, and the second V-signal VS2 is shifted to a level corresponding to the source voltage VDD. Therefore, the first coil CU is floated, and the ground voltage VSS is supplied to the second coil CV.

As described above, the second coil CV is maintained in a floated state at a time when the counter electro-motive force ($E_V$) of the second coil CV passes through zero. Accordingly, a time when the counter electro-motive force ($E_V$) of the second coil CV reaches zero can be simply detected. When the counter electro-motive force ($E_V$) of the second coil CV increases to become zero, a pulse of the source voltage VDD having a 120-degree valid duration is supplied to the second coil CV after a time corresponding to 30 degrees elapses. When the counter electro-motive force ($E_V$) of the second coil CV decreases to become zero, a pulse of the ground voltage VSS having the 120-degree valid duration is supplied to the second coil CV after the time corresponding to 30 degrees elapses.

Likewise, the first coil CU and third coil CW may be controlled. In the third and sixth operation stages where the first coil CU is floated, the counter electro-motive force ($E_U$) of the first coil CU may be the difference V between the voltage $V_U$ of the first coil CU and the neutral-point voltage $V_N$. Accordingly, a time when the counter electro-motive force ($E_U$) of the first coil CU reaches zero can be simply detected. When the counter electro-motive force ($E_U$) of the first coil CU becomes zero and then the time corresponding to 30 degrees elapses, a pulse of the source voltage VDD or ground voltage VSS having the 120-degree valid duration may be supplied to the first coil CU.

In the first and fourth operation stages where the third coil CW is floated, the counter electro-motive force ($E_W$) of the third coil CW may be the difference $V_{WN}$ between the voltage $V_W$ of the third coil CW and the neutral-point voltage $V_N$. Accordingly, a time when the counter electro-motive force ($E_W$) of the third coil CW reaches zero can be simply detected. When the counter electro-motive force ($E_W$) of the third coil CW becomes zero and then the time corresponding to 30 degrees elapses, a pulse of the source voltage VDD or ground voltage VSS having the 120-degree valid duration may be supplied to the third coil CW.

A time when each of the counter electro-motive forces ($E_U$, $E_V$ and $E_W$) of the respective first to third coils CU, CV and CW in the sensorless BLDC motor 110 reaches zero can be simply determined according to differences between the respective voltages $V_U$, $V_V$ and $V_W$ of the first to third coils CU, CV and CW and the neutral-point voltage $V_N$. After the time corresponding to 30 degrees elapses, a pulse of the source voltage VDD or ground voltage VSS having the 120-degree valid duration may be supplied to the first to third coils CU, CV and CW. Accordingly, a rotating magnetic field for continuously rotating the rotor of the sensorless BLDC motor 110 may be formed.

According to the sensorless BLDC motor system 100 and the driving method of the sensorless BLDC motor 110, as described above, a time when the counter electro-motive force of a specific coil CU. CV or CW reaches zero can be simply detected. The sensorless BLDC motor system 100 and the driving method of the sensorless BLDC motor 110 for supporting the 120-degree driving mode and 150-degree driving mode is provided by adjusting the first time taken until the source voltage VDD or ground voltage VSS is applied to the specific coil CU, CV and CW and the second time taken until the specific coil CU, CV and CW is floated.

Figure 9:
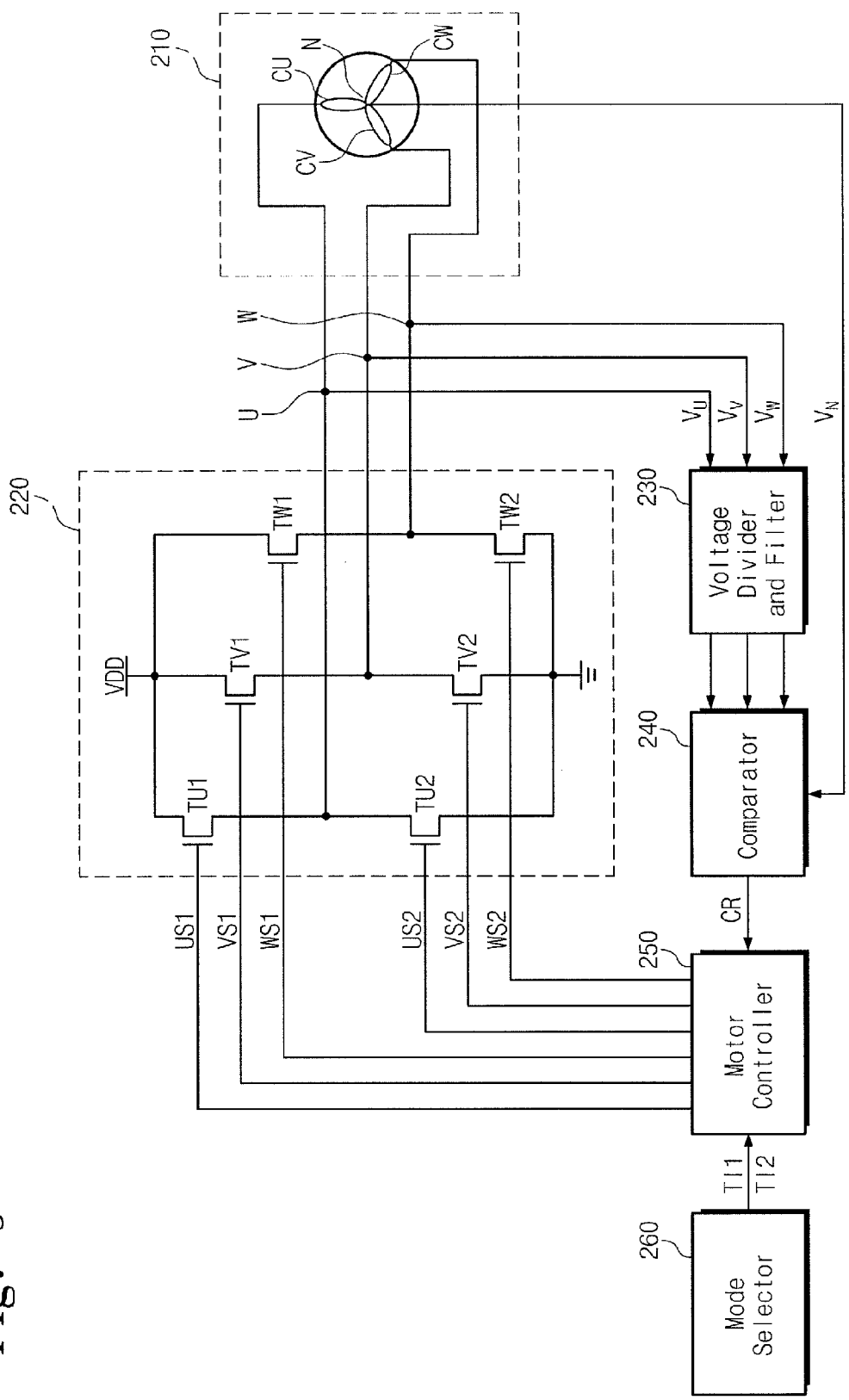
FIG. 9 is a block diagram illustrating a sensorless BLDC motor system according to a second embodiment of the present invention.

FIG. 9 is a block diagram illustrating a sensorless BLDC motor system 200 according to a second embodiment of the present invention.

Comparing with the sensorless BLDC motor system 100 that has been described above with reference to FIG. 1, the sensorless BLDC motor system 200 further includes a voltage divider and filter 230.

The voltage divider and filter 230 receives respective voltages $V_U$, $V_V$ and $V_W$ of first to third coils CU, CV and CW. The voltage divider and filter 230 receives a neutral-point voltage $V_N$ of a sensorless BLDC motor 210. The voltage divider and filter 230 may divide the respective voltages $V_U$, $V_V$ and $V_W$ of the first to third coils CU, CV and CW and the neutral-point voltage $V_N$ so as to a level capable of being compared by a comparator 240. The voltage divider and filter 230 may filter noises of the respective voltages $V_U$, $V_V$ and $V_W$ of the first to third coils CU, CV and CW and noise of the neutral-point voltage $V_N$. The divided and filtered voltages are delivered to the comparator 240.

The comparator 240 compares the divided and filtered voltages $V_U$, $V_V$ and $V_W$ with the divided and filtered neutral-point voltage $V_N$.

According to the embodiments of the present invention, a timing for supplying a voltage to a coil and a timing for floating the coil vary according to a determined driving mode. Accordingly, provided are the BLDC motor system and the driving method of the BLDC motor, which support the 120-degree driving mode and the 150-degree driving mode.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A sensorless Brushless Direct Current, BLDC, motor system comprising:
a BLDC motor comprising first to third coils;
a comparator comparing a voltage of a specific coil of the first to third coils with a neutral-point voltage to output the compared result;
a motor controller generating first and second coil control signals based on the compared result, wherein the voltage of the specific coil becomes equal to the neutral-point voltage and a specific time elapses, and then the motor controller generates the first and second coil control signals;
a three-phase inverter supplying a source voltage or ground voltage to the specific coil, or floating the specific coil, in response to the first and second coil control signals; and
a mode selector selecting a driving mode of the BLDC motor by adjusting the specific time.

2. The sensorless BLDC motor system of claim 1, wherein the mode selector adjusts the specific time for the BLDC motor to be driven in one of a 120-degree driving mode and 150-degree driving mode.

3. The sensorless BLDC motor system of claim 1, wherein the mode selector adjusts the specific time to a time corresponding to a 30-degree rotation duration of the BLDC motor.

4. The sensorless BLDC motor system of claim 1, wherein the mode selector adjusts the specific time to a time corresponding to a 15-degree rotation duration of the BLDC motor.

5. The sensorless BLDC motor system of claim 1, wherein, the voltage of the specific coil increases to become equal to the neutral-point voltage and the specific time elapses, and then the motor controller activates the first coil control signal, and
the three-phase inverter supplies the source voltage to the specific coil in response to the activation of the first coil control signal.

6. The sensorless BLDC motor system of claim 5, wherein the motor controller floats the specific coil after a time corresponding to a 120-degree rotation duration of the BLDC motor elapses.

7. The sensorless BLDC motor system of claim 5, wherein the motor controller floats the specific coil after a time corresponding to a 150-degree rotation duration of the BLDC motor elapses.

8. The sensorless BLDC motor system of claim 1, wherein, the voltage of the specific coil decreases to become equal to the neutral-point voltage and the specific time elapses, and then the motor controller activates the second coil control signal, and
the three-phase inverter supplies the ground voltage to the specific coil in response to the activation of the second coil control signal.

9. The sensorless BLDC motor system of claim 1, wherein the neutral-point voltage corresponds to a voltage of a neutral point of the BLDC motor.

10. A driving method of a sensorless Brushless Direct Current, BLDC, motor including first to third coils, the driving method comprising:
determining a driving mode of the BLDC motor;
determining a first time and a second time according to the determined driving mode;

supplying a voltage to a specific coil of the first to third coils after a voltage of the specific coil becomes equal to a neutral-point voltage and the first time elapses; and floating the specific coil after the supplying of a voltage is performed and the second time elapses.

11. The driving method of claim 10, wherein the voltage of the specific coil increases to become equal to the neutral-point voltage and the first time elapses, and then a source voltage is supplied to the specific coil.

12. The driving method of claim 10, wherein the voltage of the specific coil decreases to become equal to the neutral-point voltage and the first time elapses, and then a ground voltage is supplied to the specific coil.

13. The driving method of claim 10, wherein,
the determining of a driving mode comprises determining a 120-degree driving mode, and
the determining of a first time and a second time comprises determining the first time as a time corresponding to a 30-degree rotation duration of the BLDC motor, and determining the second time as a time corresponding to a 120-degree rotation duration of the BLDC motor.

14. The driving method of claim 10, wherein,
the determining of a driving mode comprises determining a 150-degree driving mode, and
the determining of a first time and a second time comprises determining the first time as a time corresponding to a 15-degree rotation duration of the BLDC motor, and determining the second time as a time corresponding to a 150-degree rotation duration of the BLDC motor.

* * * * *